US008192134B2

(12) United States Patent
Brewer, III et al.

(10) Patent No.: US 8,192,134 B2
(45) Date of Patent: Jun. 5, 2012

(54) LIFTING MECHANISM WITH A TILTING PLATFORM FOR TRANSFERRING PAPER STACKS

(75) Inventors: Charles R Brewer, III, Farmington, NY (US); Thomas C Palumbo, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 570 days.

(21) Appl. No.: 12/209,287

(22) Filed: Sep. 12, 2008

(65) Prior Publication Data
US 2010/0066014 A1    Mar. 18, 2010

(51) Int. Cl.
*B62B 1/06* (2006.01)
*B62B 1/14* (2006.01)

(52) U.S. Cl. ............ 414/444; 280/47.29; 414/490; 414/642; 414/789.9; 254/3 C (58) Field of Classification Search .......... 280/47.29; 414/444, 445, 449, 490, 642, 789.9, 924; 254/3 R, 3 C, DIG. 7
See application file for complete search history.

(56) References Cited

U.S. PATENT DOCUMENTS

| 1,425,999 | A | * | 8/1922 | Morrow | 414/738 |
|---|---|---|---|---|---|
| 1,653,927 | A | * | 12/1927 | Pryor | 280/47.29 |
| 2,078,217 | A | * | 4/1937 | Best | 280/47.34 |
| 2,135,802 | A | * | 11/1938 | Dinkins | 414/428 |
| 2,215,529 | A | * | 9/1940 | Nazarko | 414/490 |
| 2,572,945 | A | * | 10/1951 | Quesnoit | 414/480 |
| 3,155,255 | A | * | 11/1964 | Daniel | 414/444 |
| 3,684,110 | A | * | 8/1972 | Meyercord | 414/444 |
| 3,782,569 | A | * | 1/1974 | Montgomery | 414/476 |
| 3,825,134 | A | * | 7/1974 | Stobb | 414/802 |
| 3,939,999 | A | * | 2/1976 | Nielson | 414/444 |
| 4,052,080 | A | * | 10/1977 | Hedderich et al. | 280/47.26 |
| 4,541,763 | A | * | 9/1985 | Chandhoke et al. | 414/790 |
| 4,632,627 | A | * | 12/1986 | Swallows | 414/490 |
| 4,756,540 | A | * | 7/1988 | Crawford | 280/47.21 |
| 5,024,576 | A | * | 6/1991 | Meschi | 414/802 |
| 5,256,025 | A | * | 10/1993 | Williamson | 414/490 |
| 5,294,136 | A | * | 3/1994 | Dick et al. | 280/5.2 |
| 5,647,720 | A | * | 7/1997 | Golicz et al. | 414/490 |
| 5,971,691 | A | * | 10/1999 | Munson et al. | 414/398 |
| 6,099,452 | A | * | 8/2000 | Hoza et al. | 493/416 |
| 6,120,043 | A | * | 9/2000 | Crowley et al. | 280/79.2 |
| 6,918,733 | B2 | * | 7/2005 | Neuber et al. | 414/426 |
| 7,901,176 | B2 | * | 3/2011 | Minakawa | 414/789 |

FOREIGN PATENT DOCUMENTS

GB          2135962 A   *   9/1984   ............ 414/642

* cited by examiner

*Primary Examiner* — James Keenan
(74) *Attorney, Agent, or Firm* — Ronald E. Prass, Jr.; Prass LLP (57) ABSTRACT

This is a lifting mechanism especially suited to move a stack of paper to a height so that it is easier to remove or work with. The lifting mechanism has as a bottom portion a tilting platform that receives and holds a paper stack and its support. This tilting platform will be tilted in a front down position prior to and during loading of the paper stack thereon, and will automatically tilt down at its back portion when stack loaded. This is because the fulcrum of the tilting platform is located nearer the front sections of the platform than it is to the back section of the platform. When the weight of the paper stack acts upon the tilting platform, it will force the platform down at its back portion.

15 Claims, 7 Drawing Sheets

LIFTING MECHANISM WITH A TILTING PLATFORM FOR TRANSFERRING PAPER STACKS

CROSS REFERENCES TO RELATED APPLICATIONS

Illustrated and disclosed in a co-pending application Ser. No. 12/209,539 owned by the present assignee is an application relating to a stacker cart useful in handling a paper stack from a marking machine. The application based upon ID Ser. No. 12/209,539 is filed in the U.S. Patent and Trademark Office on the same date as the present application based upon Ser. No. 12/209,287. The disclosure of ID Ser. No. 12/209,539 is totally incorporated herein by reference.

This invention relates to structures useful in paper handling systems and, more specifically, to a lifting mechanism with a tilting platform for loading and transporting paper stacks from a marking system such as xerography.

BACKGROUND

While the present invention can be effectively used in a plurality of paper-handling or non-marking systems, it will be described for clarity as used in finishing modules of electrostatic marking systems such as xerography or electrophotography.

BACKGROUND

Marking systems that transport paper or other media are well known in the art. These marking systems include electrostatic marking systems, non-electrostatic marking systems, printers or any other system where paper or other flexible media or receiving sheets are transported internally to a an output device such as a stacker cart in a finisher and compiler. Many of these machines are used for collecting or gathering printed sheets so that they may be formed into books, pamphlets, forms, sales literature, instruction books and manuals and the like. Often, the loaded stacker cart is emptied or the paper stack unloaded to another surface.

The finisher and compiler are generally located at a site in these marking systems after the receiving sheets (paper) have been toned or marked. A finisher is generally defined as an output device that has various post printer functions or options such as hole punching, corner stapling, edge stapling, sheet and set stacking, letter or tri-folding, Z-Folding, Bi-folding, signature booklet making, set binding [including thermal, tape and perfect binding], trimming, post process sheet insertion, saddle stitching and others. After the paper has been finished or compiled, the paper is transported to a paper cart in a paper stacking housing in the finisher module. From there, this paper stack may be moved to other locations for collection.

The paper after finishing is collected onto a stacker cart that is usually located on a bottom portion of a housing of the finisher module of the printing system. The stacker cart has wheels so that it can be easily rolled out of the lower finisher module housing to some other location or surface. Since the paper stack on the stacker cart is heavy, it needs mechanical or other lifting assistance to lift the stack off the stacker cart in after it leaves the lower housing of the finisher module.

On conventional lift devices, a fixed horizontal platform is used for loading and transporting paper media. While simple in design, the disadvantages of the paper stack accidentally sliding off either while stationary (due to the platform not being exactly level) or while the lift with the load in place is being moved to another station are apparent. The present invention obviates the need for a complicated locking or braking mechanism on either the lift platform or on each plate.

SUMMARY

The present invention comprises a lifting mechanism comprising an over center pivoting tilting plate that would allow loading movable or sliding plates containing stacks of paper onto an electrically or manually driven lift device. The tilting plate would have simple means to allow the plate to lift on one end, thereby enabling a lower interface point. Once the procedure of loading the movable plates starts from the finisher stacker cart, the mechanism would pivot the tilting plate. The movable plate now is fully in position for transport. The tilting plate would be declining from the pivot point to the lift platform of such angle the movable plate can not roll off, thereby safely capturing the load. The assembly and all ensuing mechanisms is self-contained, allowing simple attachment to the electric lift device by various means. The fulcrum or pivot point of the tilting plate or platform is not centered but rather is located at a position closer to the front of the tilting platform. In this way, the platform front tilts down, then when loaded, the weight of the paper stack will cause the tilting platform to tilt downwardly at its rear portion.

The movable plate of co-pending patent application Ser. No. 12/209,539 can be conveniently used to move the stack from the stacker cart or any other suitable means may be used. The tilting plate or platform of this invention is capable of accepting a loaded plate or stack of paper from a finisher module that, once loaded, would provide a method of capturing the stack load by the action of tilting. This platform is moved to engage the finisher stacker cart. The platform will tilt which allows the edge of the platform to be lower than the pivot point, providing thereby access to stacker carts that are low to the floor.

Positioned above the tilting platform is a pulley (or any other suitable pulling means) that has a cable or rope attachable to the paper stack support or plate that is enabled to unload this support with the paper stack onto the tilting plate. Once the paper stack is on the tilting plate, the plate will tilt backwardly allowing the stack to be securely held by the tilting plate (see FIG. 4). The lifting mechanism of this invention is specifically suitable for moving and lifting paper stacks from the finisher module of a marking system, or obviously as above noted, can be used in any other paper transporting or handling system. A clamping or other means may optionally be used to put pressure on the top paper surface of the paper stack to hold the stack firmly in place after the stack is on the tilting plate. Thus, while the bottom of the paper stack is held on the tilting plate by the pulley cord, the top of the stack may be secured by a top pressure clamp.

Therefore, the lifting mechanism of this invention comprises an over-center pivoting plate that allows loading movable plates (containing stacks of paper) onto the present lift device. Through optional spring force, or even without springs, the plate lifts on one end (opposite the loading end), enabling the loading end to be at a lower point to a finisher stacker cart (or trolley) edge. Once the movable plate with the paper stack starts to move off the cart, the mechanism would pivot the tilting plate away from the cart. This movable plate now is in position for transport (stack secure). The tilting plate would be pivoted the opposite direction from the loading end thereby safely capturing the load. The assembly and all mechanisms are self contained, allowing simple attachment to the electric lift device of this invention by various means.

The paper stack once loaded onto the lift of this invention may be raised or vertically lifted to any workable level where the paper can easily be unloaded or further processed.

DETAILED DISCUSSION OF DRAWINGS AND PREFERRED EMBODIMENTS

Figure 1:
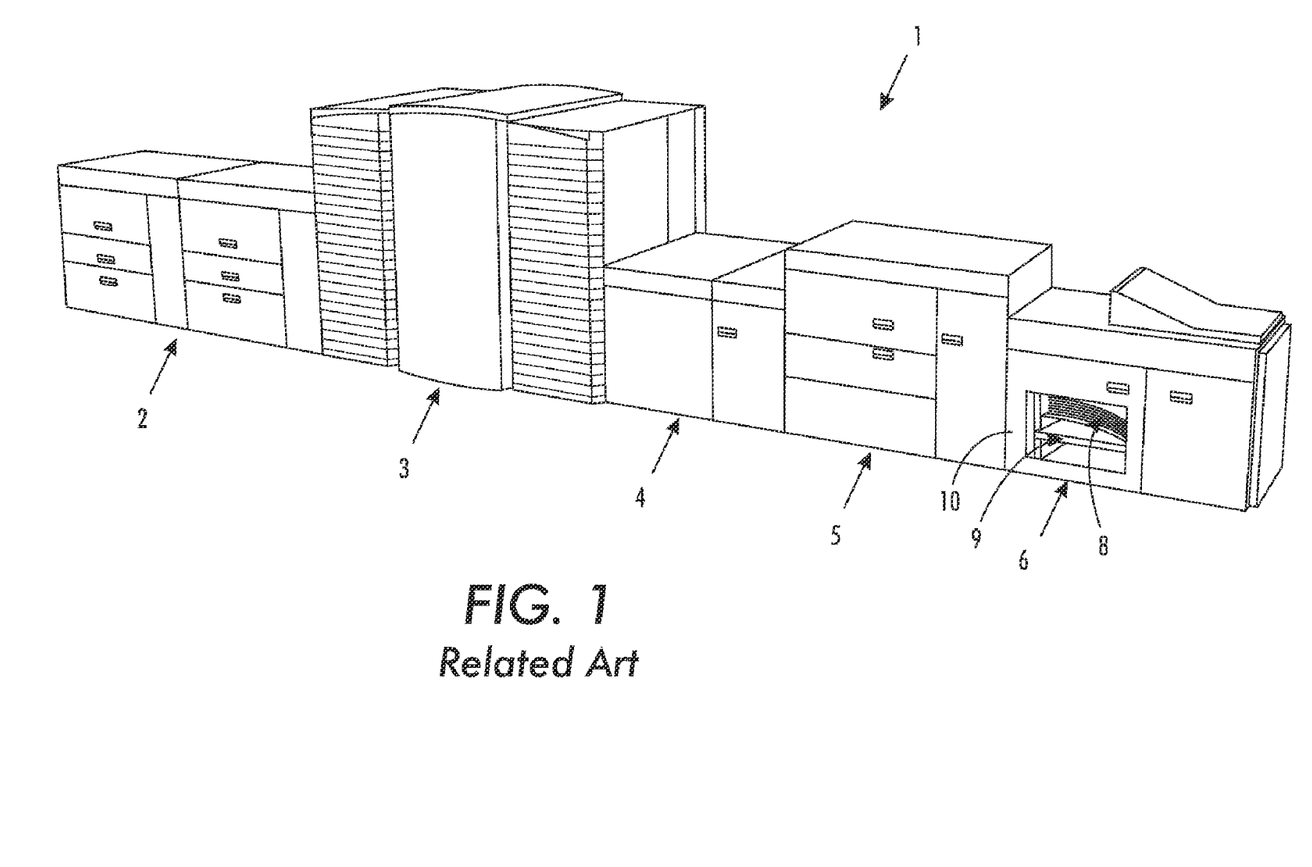
FIG. 1 illustrates a typical printing system with a stacker cart inside a lower positioned housing of a finisher module.

In FIG. 1, a typical printing system 1 that is suitable for use with the lifting mechanism of the present invention is shown. This printing system 1 comprises a paper feeder module 2, a printing module 3, an inverter module 4, an inserter module 5, and a finisher module 6. The lifting mechanism 7 of this invention can be used, however, in any paper handling system, both marking systems and non-marking (paper handling) systems. The lift mechanism 7 of this invention can be any suitable mechanical or electrical lift mechanism. FIG. 1 shows a finisher module 6 having a finished paper stack 8 supported on a finisher stacker cart 9 as viewed through a window on finisher module door 10. Once the paper stack 8 is completed, it and stacker cart 9 are to be removed from finisher module 6 to another location. The stacker cart 9 has wheels which enable it to be easily rolled out of finisher module 6. Once the stacker cart 9 is removed, from finisher module 6, it is rolled adjacent to the lifting mechanism 7 of this invention.

Figure 2:
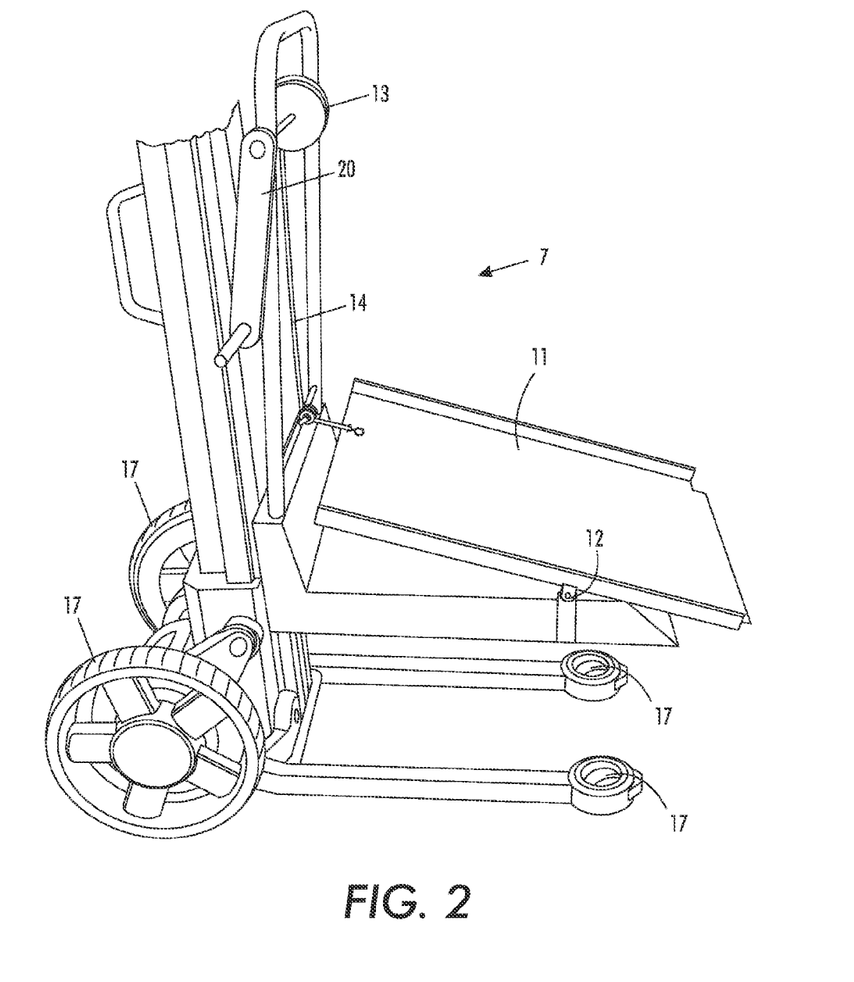
FIG. 2 illustrates an embodiment of the lifting mechanism of this invention.
Figure 6:
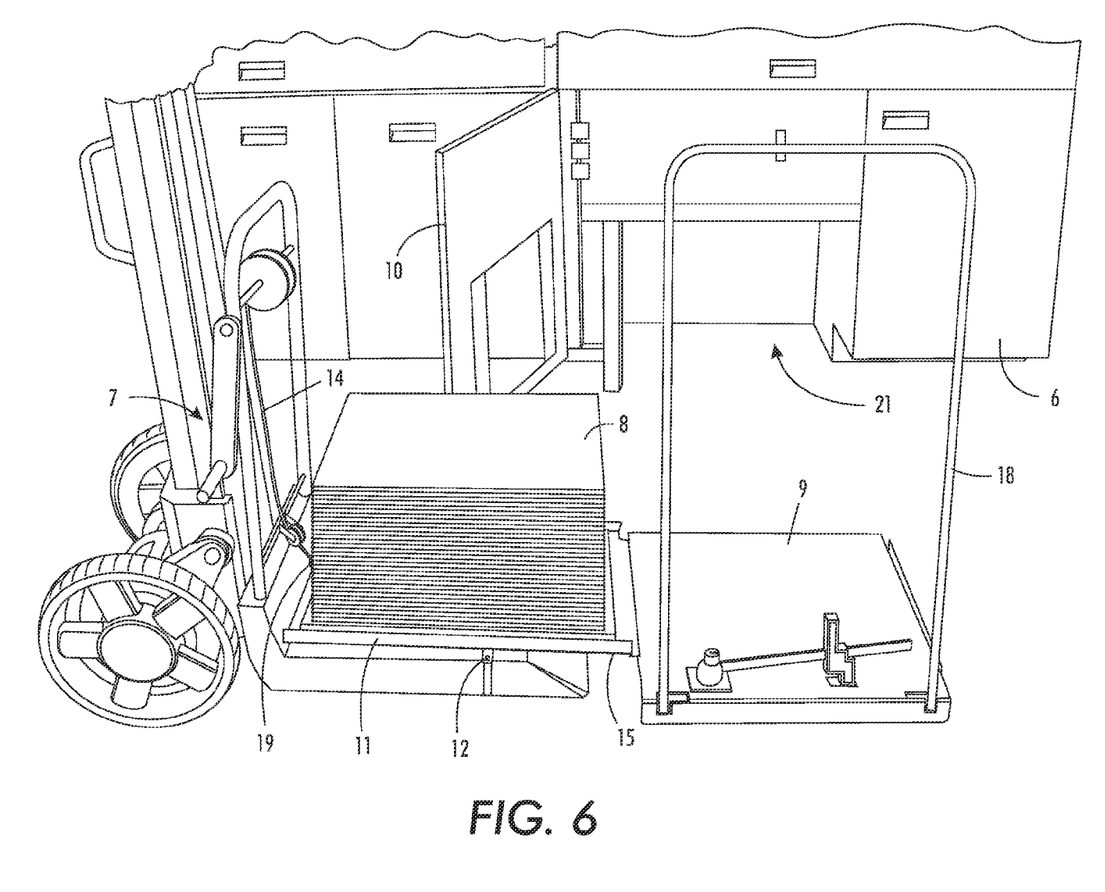
FIG. 6 illustrates the paper stack after unloading from the stacker cart with the tilting plate in its backward tilting after loading position.

FIG. 2 illustrates an embodiment of the lifting mechanism 7 of this invention. This mechanism comprises at its lower loading section a tilting platform or plate 11. This platform 11 is tiltably mounted on a fulcrum or pivot point 12 upon which it moves and tilts. Prior to loading a paper stack 8 onto the platform 11, the platform front section 11 is tilted forward in a loading position, whereas the back section is lifted upwardly. This enables a lower platform interface point. Once the procedure of loading the stack 8 from the stacker cart 9 begins, the front portion of platform 11 will pivot downward as shown in FIG. 2. Once the loading of the stack is completed, the platform 11 back portion will pivot downward and the front will pivot upward as shown in FIG. 6. A pulley 13 having a pull cable 14 is provided on the lift 7 for pulling the stack 8 and its support 15 onto the tilting platform 11. A top clamp, may be provided for securing the top portion of paper stack 8. Wheels or rollers 17 allow easy moving of the lift mechanism 7 of this invention.

Figure 3:
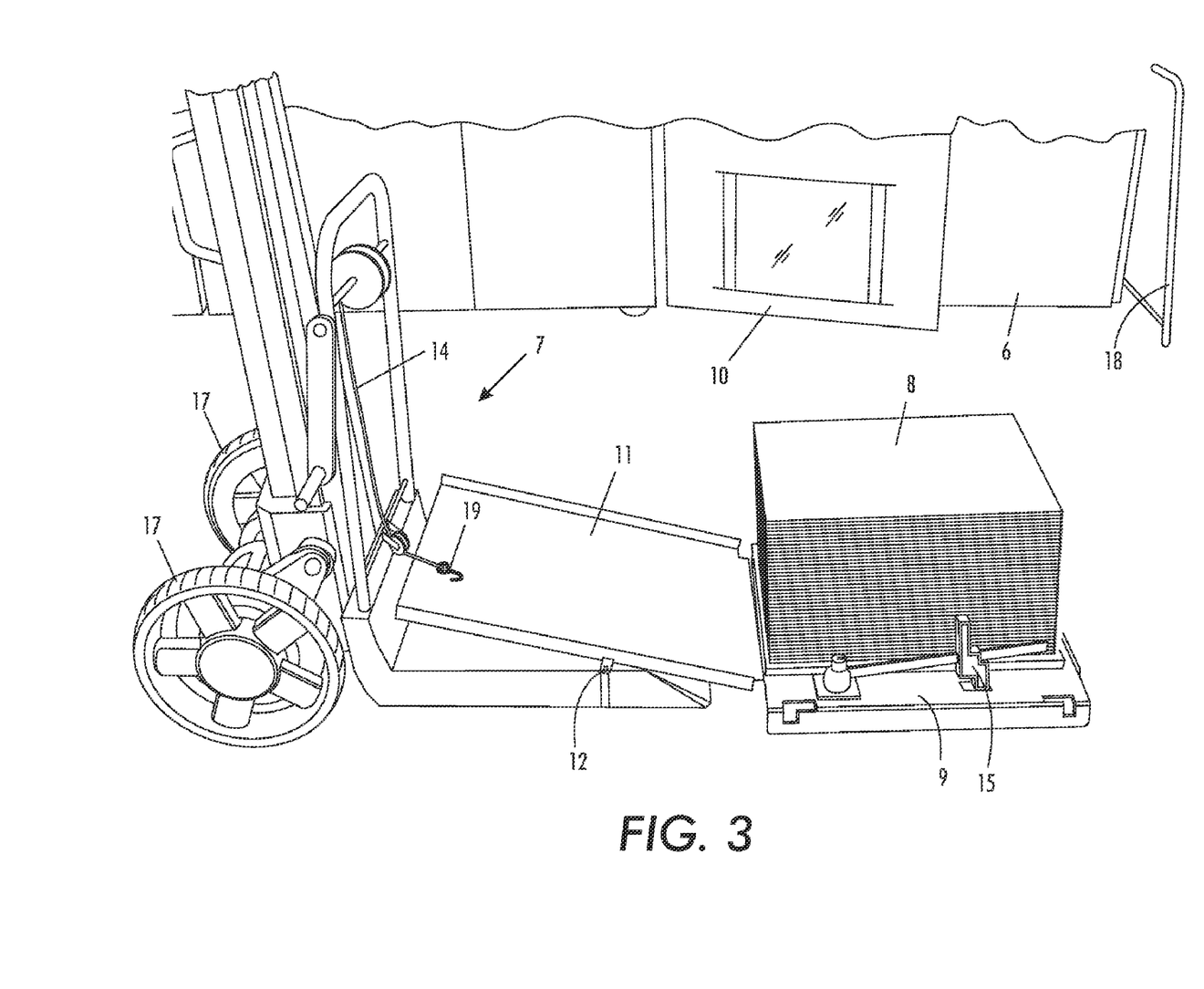
FIG. 3 illustrates the lifting mechanism of this invention as it is about to take onto the load-paper stack, transferred from the stacker cart.

After the stacker cart 9 and paper stack 8 have been removed from finisher module 6, it is moved adjacent the lift mechanism 7 of this invention as shown in FIG. 3 ready to be loaded onto lifting platform 11. Stacker cart moving handle 18 is used to move the stacker cart 9 up to the lift mechanism 7. This moving of stacker cart 9 is described in detail in co-pending application ID Ser. No. 12/209,539. A hook 19 at the end of pull cable 14 is attached to the stack support 15 and used to pull the support 15 and stack 8 onto tilting platform 11. This pulling can be manual or electrical or any other suitable means. After loading, the stacker cart 9 is returned to finisher module 6 for further use.

Figure 4:
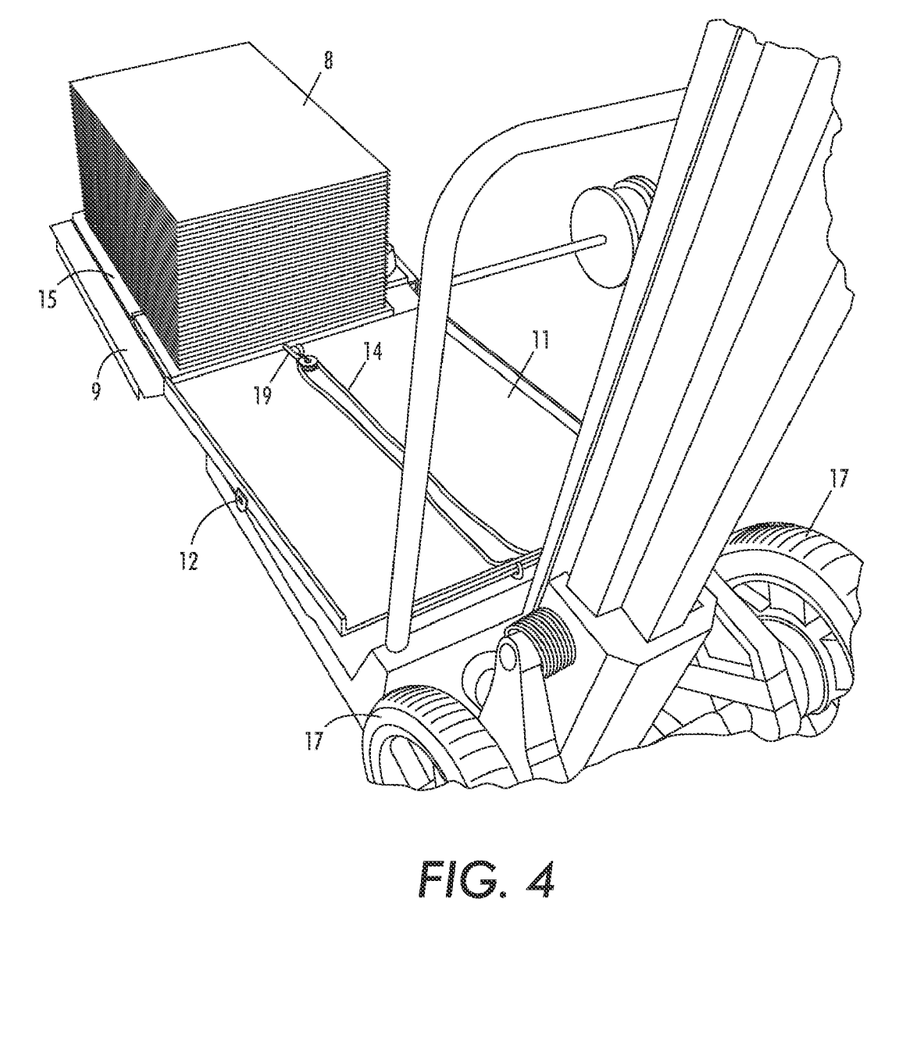
FIG. 4 illustrates the stacker cart as it is being pulled into the tilting plate of the lifting mechanism of this invention.

In FIG. 4, the attachment of hook 19 to paper stack support 15 is shown as they are being transferred or pulled from stacker cart 9 to tilting platform 11. The support 15 can be the slidable support described in co-pending application ID Ser. No. 12/209,539, or can be any other suitable easily slidable support. Notice that the tilting platform 11 front section is tilted forward in its loading position as it tilts on pivot point 12.

Figure 5:
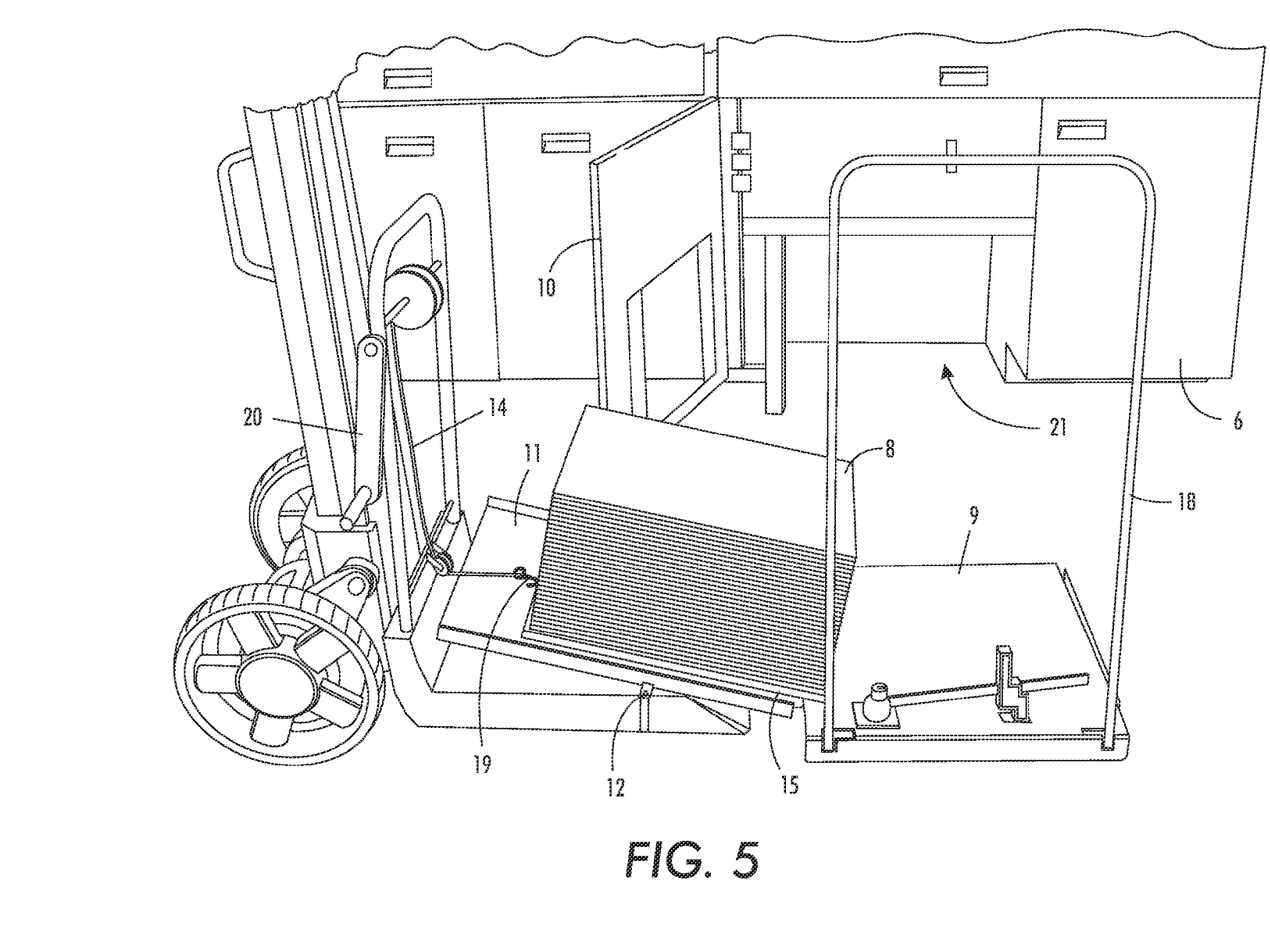
FIG. 5 illustrates the paper stack and its support plate as it is pulled off the stacker cart, and shows the tilting forward of the tilting plate in its forward tilting loading position.

In FIG. 5 the paper stack 8 and its support 15 are shown partially loaded onto tilting platform or plate 11. Platform 11 is still in its forward tilting position until the weight of fully loaded paper stack 8 forces the back section of platform 11 to tilt backward as shown in FIG. 6. Pulley 13 continues to pull the stack 8 and support 15 as it is turned manually by pulley handle 20, or it can operate electrically. Stacker cart 9 when unloaded can now be returned to finisher module 6 for further use. The handles 18 are used to move stacker cart 9 to and from finisher module 6 or any other housing.

In FIG. 6, the lifting mechanism 7 of this invention is shown fully loaded where the tilting plate 11 is now in its loaded position tilting backward, with its front portion tilting upwardly. The weight of the paper stack 8 forces the tilting platform 11 down in the back and up in the front as shown in FIG. 6. The paper stack 8 is now raised manually or electrically to any height for convenient paper removal or further processing. The stacker cart 9 is now emptied and ready to be pushed by handles 18 back into the housing 21 of finisher module 6.

Figure 7:
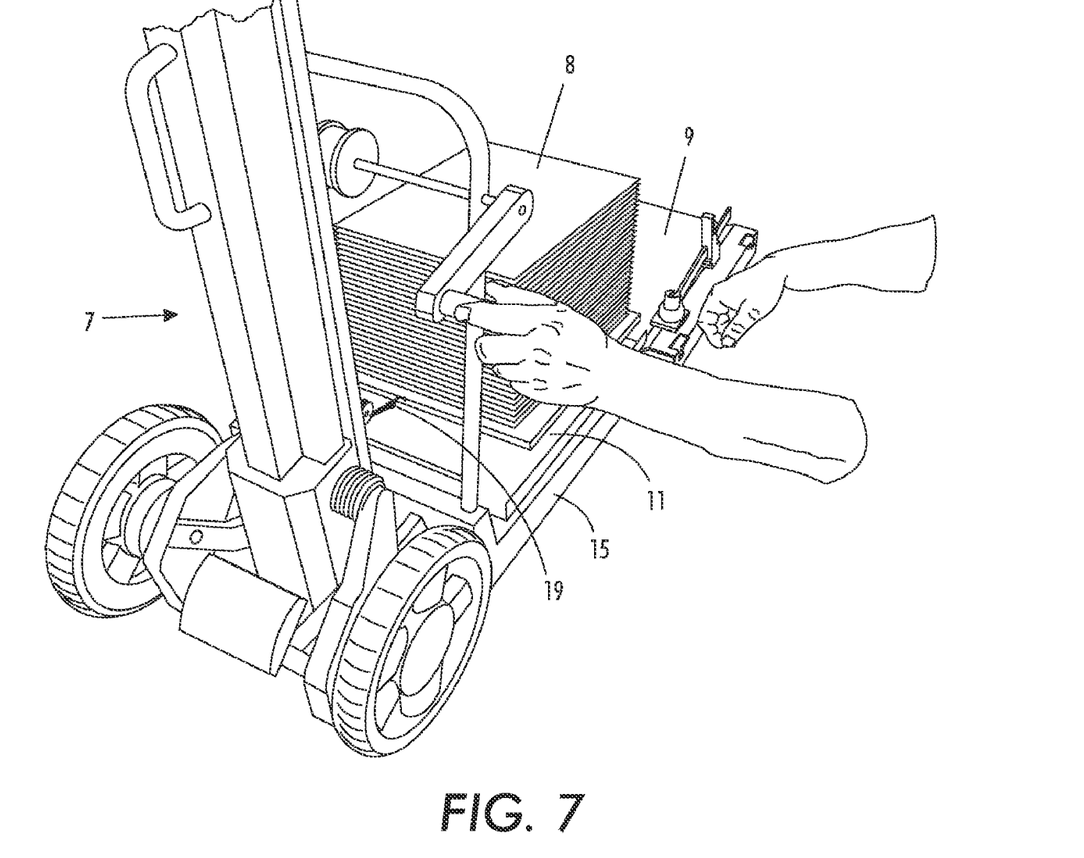
FIG. 7 illustrates the paper stack after loading being secured by the pulley cable on the bottom and the top pressure clamp on the top.

In FIG. 7 the fully loaded tilting platform 11 is shown tilting down in its back portion. A top clamp, which is optional, can be used on the top of stack 8 if desirable. The platform 11 is now lifted to whatever height is desired so that the heavy stack 8 can be conveniently worked with. The loaded lift mechanism 7 of this invention can be moved via wheels 17 to any suitable location, and stacker cart 9 returned to the housing 21 (as shown in FIG. 6) for future use. A critical element of the lift of this invention is the tilting platform or plate 11 which automatically falls to the loaded down position as in FIG. 6 when weighted down by the paper stack 8 and returns to the front upper lifted loading position as shown in FIG. 3.

This invention provides a lift mechanism configured to move a stack of paper. This lift mechanism comprises wheels enabled to move it from location to location, a tilting platform located at a loading location of the mechanism, and a pulley adapted to pull a paper stack load onto the tilting platform. The tilting platform comprises a flat receiving surface adapted to receive a paper stack load. The tilting platform is configured to tilt forwardly on a pivot point or a fulcrum until substantially fully loaded. The fulcrum is located nearer to a front portion of said tilting platform than it is to a back portion of said platform. The tilting platform is movable upon a fulcrum or pivot point. The fulcrum is enabled and positioned so as to automatically allow the back of the platform to tilt downwardly when substantially fully loaded. A pulley is positioned above the tilting platform; this pulley is configured with a cable to pull a paper stack onto the tilting platform. The tilting platform has raised side edges enabled to prevent substantial shifting of a paper stack load.

The tilting platform has a beveled front edge portion configured to allow a paper stack support to be easily transported or slid thereon. The lift mechanism has a pulley-cable structure with a hook located at an end of the cable. The hook is adapted to be connected to a paper stack support when pulling said support onto the tilting platform. The fulcrum is pivotally positioned closer to a front end of the tilting platform than it is to a back end of the said tilting platform. A front portion of the tilting mechanism is configured to tilt downward and function together with a pulling cable to move a paper stack and its support onto a receiving surface of the tilting mechanism.

The lift mechanism is movable on front and back wheels and has a manual or electrical lifting capacity enabled to lift the stack of paper to a desired height. The tilting platform has a front tapered portion enabled to allow a paper support to slide thereon, and side raised portions enabled to hold a paper stack in position. The tilting platform is enabled to move downwardly at its back portion at such an angle to prevent a paper stack support from rolling off the platform. The angle and the raised side portions are configured to securely hold the paper stack in position. The tilting platform is enabled to move downwardly at its back portion at such an angle to prevent a paper stack support from rolling off the platform. The angle and the raised side portions are configured to securely hold the paper stack in position.

The present invention includes the lift mechanism structure earlier described and a process for removing a paper stack from a marking finisher machine. This process comprises collecting processed and marked paper on a wheeled stacking cart which is located in a housing in a lower portion of the finishing module or machine. The stacking cart has on its paper receiving surface a sliding plate placed thereon prior to collecting paper on this sliding plate. The stacking cart is rolled out of the housing and placed next to and on the same level with a tilting platform of a lifting mechanism.

The process includes loading the sliding plate onto a receiving surface of the tilting platform, the tilting platform pivotable upon a pivot point or fulcrum. The present invention includes the lift mechanism structure earlier described and is a process for removing a paper stack from a marking-finisher machine. This process comprises collecting processed and marked paper on a wheeled stacking cart. This stacking cart is located in a housing in a lower portion of the finishing module or machine. The stacking cart has on its paper receiving surface a sliding plate placed thereon prior to collecting paper on this sliding plate. The stacking cart is rolled out of the housing and placed next to and on the said level with a tilting platform of a lifting mechanism. The process includes loading the sliding plate onto a receiving surface of a tilting platform, the tilting platform pivotable upon a pivot point or fulcrum. The fulcrum is located nearer to a front portion of the tilting platform than it is to a back portion of the platform. A cable is attached on a pulley to a front portion of the sliding plate to pull and load the paper stack onto the tilting platform. The loading is continued until the paper stack is substantially fully loaded on the tilting platform so as to permit the tilting platform to tilt downwardly at its rear portions, subsequently lifting the paper stacked and tilting platform vertically to a desired virtual level for removal or further processing of the marked paper of the stack.

The sliding plate comprises on its bottom portion a plurality of sliders configured to permit the sliding plate to move easily off the stacker cart. These sliders are in one embodiment made of polyethylene or any other slippery or slidable plastic or other material of high molecular weight. The front portion of the tilting platform tilts downward during loading and its back portion is configured so as to automatically tilt downwardly when substantially fully loaded onto said lifting mechanism.

In one embodiment, the pulley is positioned above the tilting platform and configured with the cable to pull the paper stack onto the tilting platform. The process continues to lifting the paper stack and tilting platform to a desired vertical level by electrical or manual means.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A hand-cart lift mechanism configured to move a stack of printing paper, the hand-cart lift mechanism having a single wheel set, the wheel set having a first wheel connected to a first end of an axle, and a second wheel connected to the second end of an axle, the wheel set being configured to accommodate moving the hand-cart from a first location to a second location, said wheel set being connected to a hand-cart frame, said lift mechanism comprising:
   a movable loading platform, said movable loading platform being movable independently of said wheel set, said movable loading platform being slidably mounted to said hand-cart frame;
   a tilting platform, the tilting platform being pivotably connected to said movable loading platform at a pivot point;
   a pulley system, the pulley system being configured to pull a printing paper stack onto said tilting platform, said pulley system comprising a pulley and a cable, said pulley being mounted to said movable loading platform, said pulley system comprising a rotatable handle connected to said pulley, said handle being configured for manually controlling said pulley system,
   said tilting platform comprising a substantially flat receiving surface adapted to receive said paper stack,
   said tilting platform being configured to tilt with respect to the movable loading platform on the pivot point until substantially fully loaded, said pivot point being located on said movable loading platform, said movable loading platform being configured to lower said tilting platform and lift said tilting platform, said tilting platform being configured to tilt from a loading position wherein said tilting platform is tilted to receive the paper stack, to a loaded position wherein the received paper stack is loaded onto said tilting platform and above said movable loading platform, wherein a surface of said tilting platform is substantially parallel to a surface of said loading platform.

2. The lift mechanism of claim 1, comprising said pulley being positioned above said tilting platform, said cable being configured to connect to a printing paper support, said pulley and said cable being configured to pull said printing paper support onto said tilting platform, causing said tilting platform to tilt from said loading position to said loaded position, said printing paper support having the printing paper positioned on a surface of said printing paper support.

3. The lift mechanism of claim 1 where said tilting platform has raised side edges enabled to prevent substantial shifting of a paper stack load thereon.

4. The lift mechanism of claim 1 wherein said tilting platform has a beveled front edge portion configured to allow a paper stack support to be easily slid or transported thereon.

5. The lift mechanism of claim 1, comprising said cable having a hook configured to attach to said cable said hook being configured to connect to a paper stack support, said paper stack support being configured to hold the paper stack.

6. The lift mechanism of claim 1 wherein said pivot point is pivotally positioned closer to a front end of said tilting platform than to a back end of said tilting platform.

7. The lift mechanism of claim 1 wherein a front portion of said tilting mechanism is configured to tilt downward and said pulley system being configured to move a paper stack and its support onto a receiving surface of said tilting mechanism.

8. A lift mechanism configured to move a stack of paper, said lift mechanism comprising:
   wheels enabled to move it from location to location, the wheels being attached to a frame,
   a loading platform, the loading platform being movable independent of the frame;
   a tilting platform; and
   a manually operable pulley adapted to pull a paper stack load onto said tilting platform, said manually operable pully being rotatably connected to said pulley,
   said tilting platform comprising a flat receiving surface adapted to receive a paper stack load,
   said tilting platform configured to tilt on a pivot point or a fulcrum until substantially fully loaded, said pivot point or fulcrum being attached to said loading platform said tilting platform movable upon said fulcrum or pivot point, said fulcrum enabled and positioned so as to automatically allow the back section of said platform to tilt downwardly when substantially fully loaded,
   wherein said pulley is positioned above said tilting platform, said pulley being configured with a cable for pulling said paper stack onto said tilting platform.

9. The lift mechanism of claim 8 wherein said tilting platform has raised side edges enabled to prevent substantial shifting of the paper stack load thereon.

10. The lift mechanism of claim 8 wherein said tilting platform has a beveled front edge portion configured to allow a paper stack support to be easily slid or transported thereon.

11. The lift mechanism of claim 8 having a hook located at an end of said cable, and a paper stack support being a plate configured for supporting printing paper, said hook adapted to be connected to the paper stack support for pulling said plate onto said tilting platform.

12. The lift mechanism of claim 8 wherein said fulcrum is pivotally positioned closer to a front end of said tilting platform than to a back end of said tilting platform.

13. A hand-cart lift mechanism configured to move a stack of paper, said lift mechanism comprising
   a first wheel and a second wheel enabled to move said hand-cart lift mechanism from location to location,
   a tilting platform located at a loading location of said mechanism, and
   a pulley adapted to pull a printing paper stack load onto said tilting platform,
   said tilting platform comprising a flat receiving surface adapted to receive a paper stack load,
   said tilting platform configured to tilt on a pivot point or a fulcrum until substantially fully loaded,
   said fulcrum located nearer to a front portion of said tilting platform than it is to a back portion of said platform,
   said tilting platform movable upon said fulcrum or pivot point, said fulcrum enabled and positioned so as to automatically allow the back section of said platform to tilt downwardly when substantially fully loaded,
   wherein said pulley is positioned above said tilting platform, said pulley being configured with a cable for pulling said paper stack onto said tilting platform,
   said lift mechanism being movable on said wheels and having a manual or electrical lifting capacity enabled to lift said stack of paper to a desired height,
   said tilting platform having a front tapered portion, the tilting platform being configured to slidably accept a printing paper plate, said printing paper plate being configured to support said printing paper, said tilting platform having side raised portions being configured to hold a paper stack on said printing paper plate in position.

14. The lift mechanism of claim 13, wherein said cable includes a hook, said hook adapted to connect to said printing paper plate for pulling said plate onto said tilting platform.

15. The lift mechanism of claim 13 wherein a back portion of said tilting platform is enabled to move toward a surface on which the hand-cart rests at such an angle to prevent said printing paper plate from rolling off said platform, said angle and said raised side portions configured to securely hold said paper stack in position.

* * * * *